(12) United States Patent
McKinney et al.

(10) Patent No.: US 6,830,075 B1
(45) Date of Patent: Dec. 14, 2004

(54) HOSE ASSEMBLY WITH INTEGRALLY MOLDED BRAKE HOSE BRACKET

(75) Inventors: George McKinney, Clawson, MI (US); Matthew Price, New Hudson, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/435,160

(22) Filed: May 9, 2003

(51) Int. Cl.[7] .................................................. F16L 3/00
(52) U.S. Cl. ............... 138/106; 138/107; 138/DIG. 11; 248/62; 248/74.1
(58) Field of Search ............................... 138/106, 107, 138/110, DIG. 11; 188/208, 381; 248/74.1, 74.2, 62

(56) References Cited

U.S. PATENT DOCUMENTS

| | | | |
|---|---|---|---|
| 3,272,235 A | * 9/1966 | Hayhock, III et al. | 138/107 |
| 3,382,668 A | 5/1968 | Berkes et al. | |
| 3,851,672 A | * 12/1974 | De Vincent et al. | 138/106 |
| 3,885,593 A | * 5/1975 | Koerber et al. | 138/128 |
| 3,920,786 A | * 11/1975 | Brunelle et al. | 264/251 |
| 4,175,315 A | 11/1979 | Hayes, Sr. et al. | |
| 4,635,498 A | * 1/1987 | Zimmermann et al. | 74/502.4 |
| 4,809,743 A | * 3/1989 | Sukimoto et al. | 137/561 A |
| 5,460,247 A | 10/1995 | Fouts | |
| 5,542,264 A | * 8/1996 | Hortin et al. | 62/338 |
| 5,676,786 A | * 10/1997 | Mizuno et al. | 156/245 |
| 5,730,402 A | * 3/1998 | Sallen | 248/74.1 |
| 5,875,872 A | 3/1999 | Fouts | |
| 5,908,090 A | * 6/1999 | Fouts | 188/71.1 |
| 6,125,891 A | * 10/2000 | Witmer et al. | 138/177 |
| 6,293,504 B1 | * 9/2001 | Hartmann | 248/74.1 |
| 6,438,949 B1 | * 8/2002 | Nozaki | 60/322 |

* cited by examiner

Primary Examiner—James Hook
(74) Attorney, Agent, or Firm—Radar, Fishman & Grauer PLLC

(57) ABSTRACT

A hose assembly includes a brake hose and a hose bracket integrally molded around the brake hose. The hose bracket attaches the hose to a frame of a vehicle. The bracket may be made of at least one polyolefin material selected from the group consisting of polypropylene, thermoplastic olefin (TPO), thermoplastic polyolefin elastomer (TPE), polypelene, santoprene, or other similar low temperature materials suitable for automotive applications. The bracket may be molded using a low pressure molding operation. Other conventional components of the hose assembly, such as rub rings and clips, can also be integrally molded to the brake hose in conjunction with the hose bracket.

11 Claims, 2 Drawing Sheets

HOSE ASSEMBLY WITH INTEGRALLY MOLDED BRAKE HOSE BRACKET

TECHNICAL FIELD

The present invention relates generally to a hose assembly and, in particular, to a prefabricated hose assembly with a hose and a bracket integrally molded around the hose for use, for example, in a hydraulic brake system.

BACKGROUND OF THE INVENTION

In order to accommodate necessary relative motion between the sprung and unsprung masses of a motor vehicle, suspension mounted hydraulic brakes are connected to the chassis by flexible hydraulic hoses. These hoses are typically fabricated from fabric braid reinforced elastomers.

In various applications in which a flexible conduit, such as a hose, is used to convey fluid, it is necessary to bend and route the flexible conduit around various structural or frame parts of the device on which the flexible conduit is being used to convey fluid. In addition, where such a flexible conduit in the form of a hose is used to convey high pressure fluid, such as in a hydraulic system, the actual length of the hose will change due to the pressure of the fluid within the hose.

One such application, for example, is on automotive passenger and truck vehicles, wherein such flexible conduits in the form of brake hoses, are used to convey hydraulic brake fluid to the individual wheel brakes of the vehicle. In some of these vehicles, each brake hose assembly requires accurate routing, for example, from the disc brake caliper of a vehicle wheel assembly to a fixed element of the vehicle to insure proper clearance between the hose and other components of the vehicle.

Typically, the accurate routing has been affected by the use of a hose assembly including a hose having fittings at opposite ends that are provided with orientation guides such that the hose assembly can only properly mate with the components associated therewith in one predetermined position. A hose assembly when being installed requires an additional fixed routing position on the hose body intermediate to its ends. This is effected by the use of a hose support bracket having a bracket portion adapted to be fixed to the support and a hose clamp portion, clamped either directly to the hose or preferably, to a protective collar attached to the hose in position to be engaged by the hose clamp portion of the support bracket.

It has been customary to assemble such a hose support bracket to the hose at the time the hose assembly is installed in a vehicle. That is, it has been customary to install one or both end fittings of the hose assembly to their mating components, after which the hose support bracket is attached to effect proper routing of the hose intermediate its ends and to hold it in spaced relation from a support. This has been accomplished either by first fixing the hose clamp portion of the support bracket to the hose and then twisting the hose as necessary to seat the support bracket to the support on which it is attached or, alternately, first seating the bracket to its support and then, as necessary, twisting the hose into engagement with the hose clamp portion of the support bracket to permit its attachment to the support bracket. Depending on the degree of twisting effected on the hose during such an installation of the hose assembly on the vehicle, the life of the brake hose will be adversely affected as compared to the expected life of a non-twisted hose in a similar assembly.

SUMMARY OF THE INVENTION

The inventors of the present invention have recognized these and other problems associated with conventional hose assemblies. To this end, the inventors have developed a hose assembly comprising a flexible hose and a hose bracket integrally molded to the flexible hose. The hose bracket includes a clamp portion integrally formed with a mounting flange having at least one aperture formed therethrough for attaching the flexible hose to a vehicular structure.

By integrally forming the mounting flange to the flexible hose, the hose assembly of the invention provides is precisely orientated during installation, thus permitting proper flexing and other movement of the brake hose during vehicle operation, while eliminating the possibility of inadvertent twisting of the brake hose during installation. In addition, by integrally molding the bracket, the bracket can be made of a more economical material and lighter in weight than conventional brackets that are made of, for example, steel or other metal material, thereby reducing the overall weight and cost of the vehicle. Further, the integrally molded hose bracket of the invention can be formed with a non-flat contour such that the hose bracket can be secured to a location of the vehicle with a non-flat contour, unlike conventional brackets that require being secured to a substantially flat location.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
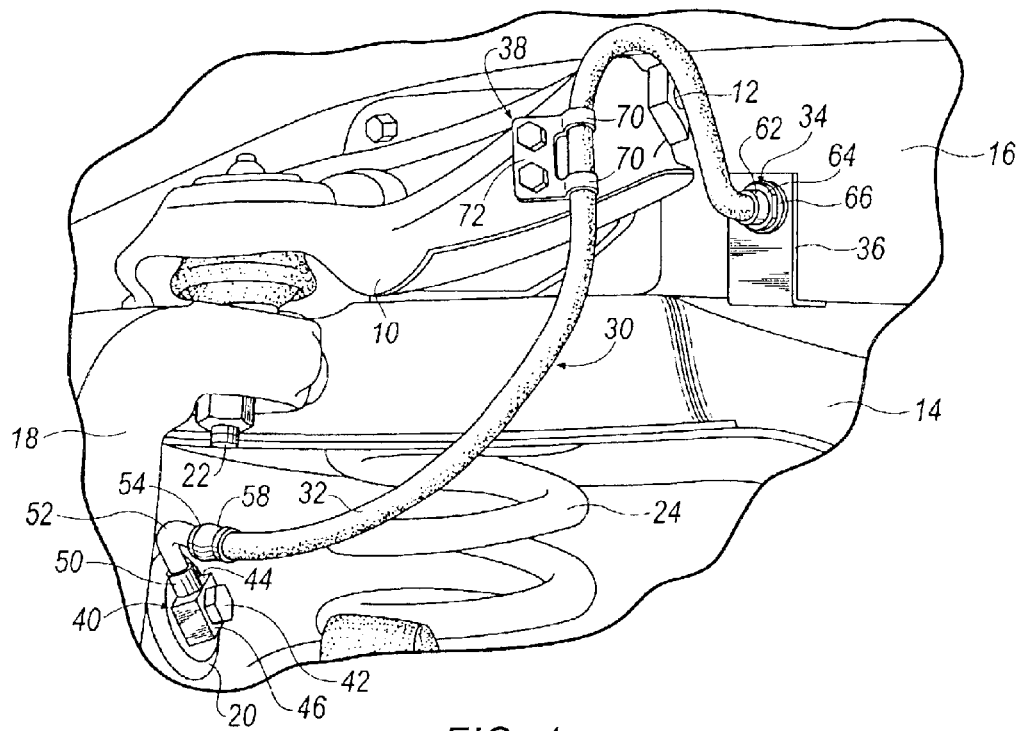
FIG. 1 is a perspective view of a portion of the front end of a passenger vehicle having a hose assembly with a hose bracket integrally molded to a brake hose according to the invention used as a hydraulic brake hose assembly for supplying hydraulic fluid to a disc brake caliper of the vehicle.

Referring now to FIG. 1, there is shown for illustrative purposes only, an environment in which the hose assembly of the invention can be used with a portion of a front end of a conventional automotive vehicle provided with, for example, an independent suspension system. Such an independent suspension system includes an upper control arm 10 and a lower control arm, not shown, supported by an upper control arm shaft 12, and a lower control arm shaft, not shown, suitably attached to the suspension cross member 14 fixed to one of the side frames 16 of the vehicle. The upper and lower control arms are connected to the steering knuckle assembly 18, supporting the wheel hub, not shown, and the disc brake caliper assembly 20, through pivoting ball socket assemblies 22, only a portion of one such ball socket assembly being shown. The coil spring 24 is located between the lower control arm and a formed seat in the suspension cross member 14.

Because of the movement of the above described elements relative to each other during vehicle operation, hydraulic fluid from the braking system, not shown, of the vehicle must be supplied to the disc brake caliper assembly 20 through a flexible conduit, usually in the form of a brake hose assembly, generally indicated by the reference numeral 30, the hose assembly shown being in accordance with the invention.

The brake hose assembly 30 includes a flexible brake hose 32 connected at one end to a hose fitting 34 secured to a conventional apertured support bracket 36 which may be an integral part of the side frame 16 or, as shown, a separate element fixed to the side frame 16, the hose fitting 34 also being connected, as is conventional, to the hydraulic brake system, not shown, of the vehicle. The hose fitting 34 is provided with one or more orientation guides thereon, to be described, so that it can only properly mate with the aperture in the support bracket in one direction, as is known in the art.

The flexible brake hose 32 can be made of any suitable material for automotive applications. Such materials include natural rubber, isoprene rubber, butadiene rubber, styrene butadiene rubber, chloroprene rubber, butadiene acrylonitrile rubber, butyl rubber, ethylene propylene rubber (EPM, EPDM), acrylic rubber, halogenated butyl rubber, olefin-based rubber, urethane-based rubber (AU, EU), hydrin rubber (CO, ECO, GCO, EGCO), polysulfide-based rubber, silicone-based rubber, fluorine-based rubber (FKM, FZ), polyethylene chloride rubber, and blends of two or more of these elastomers.

To permit proper flexing and other movement of the brake hose 32 during vehicle operation, the length of the brake hose 32 is greater than the straight line distance between the hose fitting 34 and the disc brake caliper assembly 20 and also of an adequate length to distribute movement during flexing and to avoid abrasion. As shown, the brake hose 32 is held away from structural elements of the vehicle, such as the upper control arm 10, by an integrally molded hose bracket 38 to be described in detail below.

Figure 2:
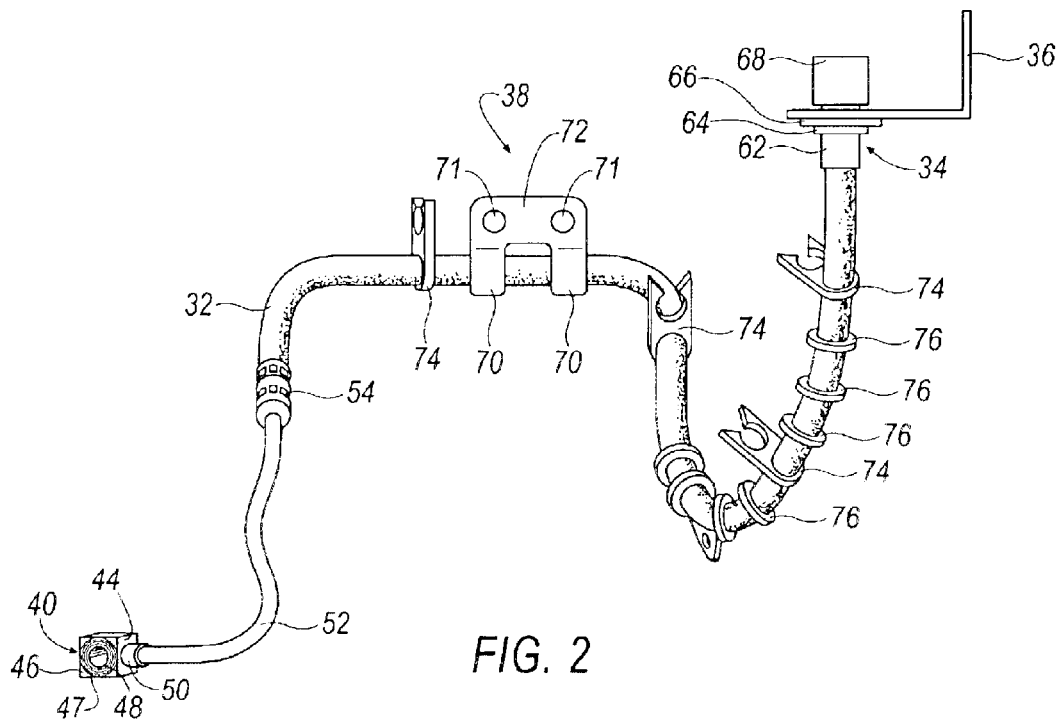
FIG. 2 is another perspective view of the hose assembly of FIG. 1 according to the invention.

As best seen in FIG. 2, at its opposite end, the brake hose 32 is connected to a banjo hose fitting 40 secured to the disc brake caliper assembly 20 by a conventional threaded hose to caliper bolt 42. The bolt 42, as is well known, is provided with a suitable passage therein for the flow of hydraulic brake fluid.

The banjo fitting 40 includes a block portion 44 having opposite parallel mounting or orientation surfaces 46 with annular serrations 47 thereon to mate against seal washers, not shown, interposed between these surfaces and the head of bolt 42 and the disc brake caliper assembly 20. The banjo fitting 40 also includes a bore or opening 48 therethrough to receive the hose to caliper bolt 42 and a centrally apertured shank portion 50 in fluid communication with the bore 48. The shank portion 50 also is in fluid communication with a bent tube adapter 52 having one end thereof secured, by any suitable means, such as by welding, to the free end of the shank portion 50. The other end of the bent tube adapter 52 is connected, again as by welding, to one end of a hose coupling 54. The bent tube adapter 52 can be bent to any desired departure bend angle from the disc brake caliper assembly to provide the proper clearance for the brake hose 32 to be held away from the structural elements of the vehicle.

The hose fitting 34, which may be either female or male threaded, includes a collar 62 and an eyelet, not shown, similar to the banjo fitting 40 by which the brake hose 32 is secured to the fitting. The hose fitting 34 also includes a central or intermediate wrench receiving section 64 and a collar 66 or backing for abutment against the support bracket 36. The end of the hose fitting 34 includes a threaded nipple 68 that is adapted to receive and provide a fluid tight connection with a pipe or tube section, not shown, forming part of the braking system for the vehicle.

Figure 3:
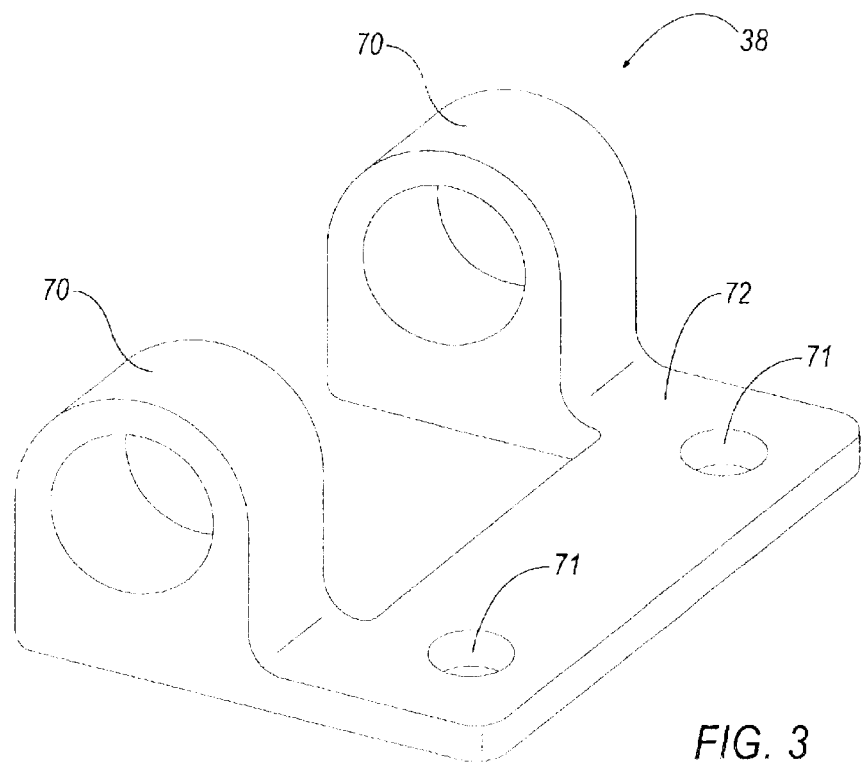
FIG. 3 is a perspective view of the hose bracket of FIG. 1 according to the invention.
Figure 4:
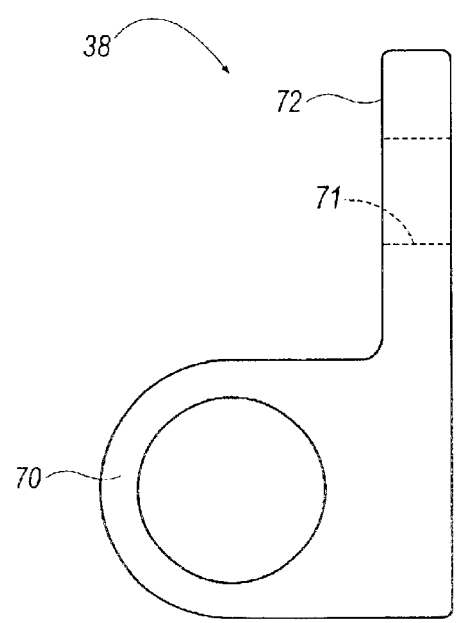
FIG. 4 is a side view of the hose bracket of FIG. 3 according to the invention.

Referring now to FIGS. 2 through 4, the hose bracket 38 is made of a suitable material, such as at least one polyolefin material selected from the group consisting of polypropylene, thermoplastic olefin (TPO), thermoplastic polyolefin elastomer CTPE), polypelene, santoprene, or other similar low temperature materials suitable for automotive applications. The hose bracket 38 includes at least one tubular hose clamping portion 70 integrally formed with and completely encircling the brake hose 32 without deforming the brake hose 32. In the illustrated embodiment, a pair of clamping portions 70 is shown, but the invention is not limited by the number of clamping portions 70 and can be practiced with any desired number of clamping portions 70.

Each clamp portion 70 is integrally formed with a mounting flange 72 having at least one aperture 71 formed therethrough. In the illustrated embodiment, a pair of apertures 71 is formed in the mounting flange 72 such that the hose bracket 38 can be mounted by means of a threaded bolt 74, or other suitable fastener to the upper control arm 10. The location of the hose bracket 38 along the length of the brake hose 32 is such that each aperture 71 is properly aligned with the corresponding aperture, not shown, in the upper control arm 10 to permit proper flexing and other movement of the brake hose 32 during vehicle operation, while eliminating the possibility of inadvertent twisting of the brake hose 32 during installation.

As best seen in FIG. 2, the hose assembly 10 may include one or more clips 74 for allowing the routing of one or more vehicle components, such as another hose or cable, along with the brake hose 32. Thus, the clips 74 takes advantage of the fact that the brake hose 32 is typically routed in a safe zone of the vehicle. In addition, the hose assembly may include one or more rub rings 76 that prevent the brake hose 32 from engaging the structure of the vehicle, thereby prolonging the life of the brake hose 32.

In fabricating the hose assembly 10 of the invention, the brake hose 32 of a desired length in a straight, relaxed, untwisted position with the fitting 34 secured at one end, and the banjo-hose fitting 40 secured to the opposite end, is placed within a conventional low pressure injection mold tool. The mold tool typically includes an upper and lower mold halves defining a mold cavity therebetween that defines the shape of the hose bracket 38. After the upper and lower mold halves are closed, molding material is injected into the mold tool to integrally mold the hose bracket 38 around the brake hose 32. The clips 74 and the rub rings 76 may also be integrally molded around the brake hose 32 in conjunction with hose bracket 38. A mandrel may be placed inside the brake hose 32 to prevent the brake hose 32 from collapsing from pressure during the injection molding operation.

One aspect of integrally molding the hose bracket 38 around the brake hose 32 is that the hose bracket 38 can be precisely oriented with respect to the fittings 34 and 40, unlike conventional hose brackets that are crimped on the brake hose after approximating the proper location and orientation of the hose bracket. With the fittings 34 and 40 and the hose bracket 38 secured in a precise predetermined relationship with respect to each other on the brake hose 32 when the hose 32 is in a straight, relaxed, untwisted position when integrally formed around the hose 32, precise location and orientation of the hose bracket, as shown in FIG. 1, will be assured. Thus, the hose assembly 10 when installed will permit proper flexing and other movement of the brake hose 32 during vehicle operation, while eliminating the possibility of inadvertent twisting of the hose 32 during installation. Precise orientation of hose 32 helps to eliminate unnecessary forces acting on the hose 32, which could reduce life of the hose 32.

Another aspect of the invention is that the integrally molded hose bracket 32 provides for a more economical bracket than conventional brackets made of, for example, steel or other similar materials. Further, the integrally molded hose bracket 32 of the invention provides for a lighter bracket as compared to conventional brackets made of metal, thereby reducing the overall weight of the vehicle.

Yet another aspect of the integrally molded brake hose bracket 32 of the invention is that the mounting flange 72 of the hose bracket 32 can be formed with a non-flat contour such that the hose bracket 32 to be secured to a non-flat location of the vehicle, unlike conventional brackets that require being secured to a substantially flat location.

It should be understood that the aforementioned and other various alternatives to the embodiments of the invention described herein may be employed in practicing the invention. For example, the principles of the invention can be practiced with other types of conduits that contain a fluid, such as a power steering hose, a clutch hose, or the like. It is intended that the following claims define the scope of the invention and that the method and apparatus within the scope of these claims and their equivalents be covered thereby.

What is claimed is:

1. A hose assembly, comprising:
   a flexible hose;
   a hose bracket integrally molded to said flexible hose and including a clamp portion integrally formed with a mounting flange having at least one aperture formed therethrough for attaching said flexible hose to a vehicular structure; and
   at least one clip integrally molded to said flexible hose.

2. The hose assembly according to claim 1, wherein the bracket is made of at least one polyolefin selected from the group consisting of polypropylene, thermoplastic olefin (TPO), thermoplastic polyolefin elastomer (TPE), polypelene, santoprene, or similar low temperature materials suitable for automotive applications.

3. The hose assembly according to claim 1, wherein said flexible hose comprises a brake hose.

4. The hose assembly according to claim 1, wherein said hose bracket is integrally molded to said flexible hose by using a low pressure injection molding operation.

5. The hose assembly according to claim 1, further comprising at least one rub ring integrally molded to said brake hose.

6. A method of manufacturing a hose assembly comprising a flexible hose and a hose bracket including a clamp portion integrally formed with a mounting flange by integrally molding the hose bracket to the flexible hose using a low pressure injection molding operation.

7. The method according to claim 6, wherein said hose assembly includes at least one clip integrally molded to said flexible hose.

8. A hose assembly a flexible hose, at least one clip integrally molded to said flexible hose, a hose bracket and including a clamp portion integrally formed with a mounting flange having at least one aperture formed therethrough for attaching said flexible hose to a vehicular structure.

9. The hose assembly according to claim 8, wherein the hose bracket is made of at least one polyolefin selected from the group consisting of polypropylene, thermoplastic olefin (TPO), thermoplastic polyolefin elastomer (TPE), polypelene, santoprene, or similar low temperature materials suitable for automotive applications.

10. The hose assembly according to claim 8, wherein said hose bracket is integrally molded to said flexible hose by using a low pressure injection molding operation.

11. The hose assembly according to claim 8, further comprising at least one rub ring integrally molded to said brake hose.

* * * * *